(12) United States Patent
Yoshinaga

(10) Patent No.: US 6,317,582 B1
(45) Date of Patent: Nov. 13, 2001

(54) MULTIMODE MOBILE TELEPHONE APPARATUS

(75) Inventor: Shigehiro Yoshinaga, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/564,882

(22) Filed: May 4, 2000

(30) Foreign Application Priority Data

May 11, 1999 (JP) .................................................. 11-130090

(51) Int. Cl.$^7$ ................................................. H04B 7/15
(52) U.S. Cl. ........................ 455/11.1; 455/509; 455/533; 455/552; 455/556; 455/566
(58) Field of Search ................................... 455/11.1, 509, 455/533, 552, 553, 556, 566

(56) References Cited

U.S. PATENT DOCUMENTS

| | | | |
|---|---|---|---|
| 5,129,096 | * | 7/1992 | Burns ...................................... 455/18 |
| 5,606,695 | | 2/1997 | Dworzecki . |

(List continued on next page.)

FOREIGN PATENT DOCUMENTS

| | | | |
|---|---|---|---|
| 0280543 A | 8/1988 | (EP) ................................ H04Q/7/04 |
| 3-1621 | 3/1991 | (JP) . |

(List continued on next page.)

OTHER PUBLICATIONS

C. Hsueh et al., "An Optimal Pinwheel Scheduler Using the Single–Number Reduction Technique", Proceedings Real–Time Systems Symposium—IEEE Computer Society, pp. 196–205, 1996.

B. Ford et al., "CPU Inheritance Scheduling", USENIX Association Proceedings of the Second Symposium on Operating Systems Design and Implementation (OSDI '96), pp. 91–105, 1996.

P. Goyal et al., "A Hierarchical CPU Scheduler for Multimedia Operating Systems", USENIX Association Proceedings of the Second Symposium on Operating Systems Design and Implementation (OSDI '96), pp. 107–121, 1996.

Anderson et al., "Support for Continuous Media in the Dash System", Proceedings of the 10$^{th}$ International Conference on Distributed Computing Systems, pp. 54–61, May, 1990.

(List continued on next page.)

Primary Examiner—Thanh Cong Le
Assistant Examiner—Lana Le
(74) Attorney, Agent, or Firm—Joel E. Lutzker; Donna Angotti; Schulte Roth & Zabel

(57) ABSTRACT

A multimode mobile telephone apparatus incorporating a transmitter; a receiver; a display unit; a dial input portion; and wireless communication means for a plurality of communication methods to establish communication with a base station, wherein the multimode mobile telephone apparatus is sectioned into single-mode portable terminals 2a and 2b with which communication is established with the base station for each communication method, a transmitter, a receiver, a display unit and a dial input portion of each of the single-mode portable terminals 2a and 2b are integrated into one shared MMI portable terminal 1, and local wireless communication means 43a, 43b, 21 is provided which establishes communication between the single-mode portable terminals 2a or 2b and the MMI portable terminal 1 by a wireless method, and selection and connection with an arbitrary single-mode portable terminals 2a or 2b are performed from the MMI portable terminal 1 through the local wireless communication means 21.

3 Claims, 2 Drawing Sheets

U.S. PATENT DOCUMENTS

| | | |
|---|---|---|
| 5,634,113 | 5/1997 | Rusterholz . |
| 5,768,592 | 6/1998 | Blelloch et al. . |
| 5,781,531 | 7/1998 | Charny . |
| 5,812,844 | 9/1998 | Jones et al. . |
| 5,850,593 * | 12/1998 | Uratani ................................ 455/11.1 |
| 6,003,061 | 12/1999 | Jones et al. . |

FOREIGN PATENT DOCUMENTS

| | | |
|---|---|---|
| 7-50877 | 2/1995 | (JP) . |
| WO 98/57444 | 12/1998 | (WO) ............................ H04B/7/185 |

OTHER PUBLICATIONS

Bollella et al., "Support for Real–Time Computing Within General Purpose Operating Systems: Supporting Co–Resident Operating Systems", Proceedings of the IEEE Real–Time Technology and Applications Symposium, pp. 4–14, May 1995.

Bolosky et al., "Distributed Schedule Management in the Tiger Video Fileserver", Proceedings of the $16^{th}$ ACM Symposium on Operating Systems Principles, Saint–Malo, France, Oct. 1997.

Bolosky et al., "The Tiger Video Fileserver", Proceedings of the $6^{th}$ Annual Workshop on Network and Operating System Support for Digital Audio and Video, Zushi, Japan, IEEE Computer Society, Apr. 1996.

Clark et al., "Supporting Real–Time Applications in an Integrated Services Packet Network: Architecture and Mechanism", *ACM SIGCOMM*, 1992, pp. 14–26.

Deng et al., "Dynamic Scheduling of Hard Real–Time Applications Environment", Proceedings on the Real–Time Systems Symposium, Washington, DC, Dec. 1996.

Dertouzos et al., "Multipocessor On–Line Scheduling of Hard–Real–Time Tasks", *IEEE Transactions on Software Engineering*, 15(12):1497–1506, 1989.

Ford et al., "Evolving Mach 3.0 to a Migrating Thread Model", Proceedings of the Winter 1994 USENIX Conference, USENIX Association, pp. 97–114, Jan. 1994.

Golub, David, "Operating System Support for Coexistence of Real–Time and Conventional Scheduling", *Technical Report CMU–CS–94–212*, Carnegie Mellon University, Pennsylvania, 1994.

Jones et al., "Modular Real–Time Resource Management in the Rialto Operating System", Proceedings of the $5^{th}$ Workshop on Hot Topics in Operating Systems, IEEE Computer Society, pp. 12–17, May 1995.

Jones et al., An Overview of the Rialto Real–Time Architecture, *Proceedings of the $7^{th}$ ACM SIGOPS European Workshop*, pp. 249–256, Sep. 1996.

Khanna et al., "Realtime Scheduling in SunOS 5.0", Proceedings of the Winter 1992 USENIX Conference, USENIX Association, Jan. 1992.

Leslie et al., "The Design and Implementation of an Operating System to Support Distributed Multimedia Applications", *Joural on Selected Areas in Communications*, 12(4), May 1995.

Mercer et al., "Processor Capacity Reserves: Operating System Support for Multimedia Applications", Proceedings of the IEEE International Conference on Multimedia Computing and Systems, May 1994.

Nieh et al., "The Design Implementation and Evaluation of SMART: A Scheduler for Multimedia Applications", Proceedings of the $16^{th}$ ACM Symposium on Operating Systems Principles, Oct. 1997.

Stoica et al., "A Proportional Share Resource Allocation Algorithm for Real–Time, Time–Shared Systems", Proceedings of the Real–Time Systems Symposium, Dec. 1996.

Waldspurger, "Lottery and Stride Scheduling: Flexible Proportional–Share Resource Management", dissertation, Massachusetts Institute of Technology, pp 4–5, 8–151, 1995.

Compton et al., "Collaborative Load Shedding", Proceedings of the Workshop on the Role of Real–Time in Multimedia/Interactive Computing Systems, IEEE Computer Society, pp. 1–7, Nov. 1993.

Liu et al., "Scheduling Algorithms for Multiprogramming in a Hard–Real–Time Environment", *Journal of the ACM*, 20(1):46–61, 1973.

Northcutt, "The Alpha Operating System: Requirements and Rationale", *Archons Project Technical Report #88011*, Department of Computer Science, Carnegie–Mellon University, pp. 1–70,Jan. 1988.

Schwan et al., "Dynamic Scheduling of Hard Real–Tme Tasks and Real–Time Threads", *IEEE Transactions on Software Engineering*, 18(8):736–748, 1992.

Sha et al., "Priority Inheritance Protocols: An Approach to Real–Time Synchronization", *IEEE Transactions of Computers*, 39(9):1175–1185, 1990.

Sommer et al., "Operating System Extensions for Dynamic Real–Time Applications", Proceedings of the Real–Time Systems Symposium, pp. 45–50, Dec. 1996.

Stankovic et al., "The Spring Kernal: A New Paradigm for Real–Time Systems", *IEEE Software* 8(3):62–72, 1991.

Wall et al., "Bus Bandwidth Management in a High Resolution Video Workstation", Proceedings of the Third International Worskshop on Network and Operating System Support for Digital Audio and Video, IEEE Computer Society, pp. 236–250, Nov. 1992.

* cited by examiner

MULTIMODE MOBILE TELEPHONE APPARATUS

BACKGROUND OF THE INVENTION

The present invention relates to a multimode mobile telephone apparatus having a structure that a plurality of portable terminals adapted to different communication systems are integrated to one multimode mobile telephone apparatus.

FIG. 2 is a diagram showing an example of the structure of a usual single-mode portable terminal. As shown in FIG. 2, a single-mode portable terminal 6, which is so-called a "mobile telephone", usually incorporates a wireless communication means 41 for establishing communication with a network so that communication with a base station 3 is established, a transmitter 27 and a receiver 26 for performing a conversation, a key pad 25 for inputting a telephone number, a display unit 24 for displaying a telephone number and so forth, a control circuit 22 incorporating a CPU (not shown) for controlling the foregoing elements and a memory 23 in which programs are stored.

A so-called man-machine interface (hereinafter called a "MMI") section which is operated by a user and supplying information to the user is constituted by the transmitter 27, the receiver 26, the key pad 25, the display unit 24, the control circuit 22 for executing the MMI program and the memory 23 in which the MMI program is stored. Note that the control circuit 22 and the memory 23 are not provided for only the MMI and arranged such that the programs for controlling the wireless communication means 41 for establishing communication with a network and the like are stored so as to be executed by the CPU. Although a portion of structures is formed such that the above-mentioned key pad 25 and the display unit 24 provided for the MMI section are realized by a display unit having a touch panel, description will now be performed about the structure incorporating the key pad 25 and the display unit 24.

There is a variety of communication systems for the mobile telephones which have variety of characteristics. For example, the PDC system exhibits a high coverage ratio of population and permits communication even during high speed movement of the user. The PHS system suffering from its narrow service area exhibits a low charge and performance of high-speed data communication. A satellite mobile telephone is able to establish communication in the mountains and on the sea area. To create a satisfactory service by combining the foregoing characteristics, a so-called multimode portable terminal 7 corresponding to a plurality of methods as shown in FIG. 3 has been developed and put into practical use. An example of the foregoing terminal is disclosed in Japanese Patent Laid-Open No 3-1621.

The mobile telephone, the service of which has been varied and the function of which has been improved, must improve its operability and ease of use for a user. When ease of use is improved, a larger number of keys, a wider display screen and a more complicated program are required. Therefore, the key pad 25, the display unit 24 and the memory 23 are enlarged or increased. Since the enlargement of the size of the MMI section, however, enlarges the overall size and overall weight of the portable terminal, the portability which is the most important requirement for the portable terminal deteriorates. A wireless telephone apparatus disclosed in Japanese Patent Laid-Open No. 7-50877 has a structure to solve the foregoing fact such that the portion including the transmitter and the receiver is separated from the other portion. The foregoing portion including the transmitter and the receiver and the other portion are connected to each other through a second wireless circuit. Thus, only the transmitter and the receiver portion having small size and light weight are made to be portable. Thus, the portability can be improved.

In general, development of the multimode portable terminal 7, however, is considerably difficult as compared with development of the single-mode portable terminal 6. As shown in FIG. 3, the multimode portable terminal 7 must incorporate a plurality of wireless communication means 41a and 41b for establishing communication with a network corresponding to supported communication methods in the case thereof. The wireless communication means 41a and 41b for establishing communication with a network accommodated adjacent to each other frequently encounters deterioration in the performance owing to interference. To solve the foregoing fact, the shielding function for preventing interference must be enhanced, the physical distance must be maintained and sophisticated control of the wireless communication means 41a and 41b for establishing communication with a network is required. As a result, there arises problems in that the size of the case and the weight of the same are enlarged, a period of time required to develop the control program is elongated, the man-hours is increased and resulting enlargement of the cost cannot be prevented.

In general, development of the MMI for the multimode portable terminal 7 requires a larger number of man-hours as compared with the MMI for the single-mode portable terminal 6. The reason for this lies in that the difference in the method causes the specifications of the MMI (for example, the number of keys, a method of invoking the menu, the number of digits of the telephone numbers which must be received and the name of the service) to usually be different. The foregoing differences do not raise a critical problem when a user selects the single-mode portable terminal 6 from a plurality of the single-mode portable terminals 6 adapted to a plurality of methods. The reason for this lies in that the user is able to recognize the difference in the specification as the difference in the terminal. Therefore, the user is convinced of performing operations of the different terminals corresponding to the different specifications.

Since the multimode portable terminal 7 is only one portable terminal from a viewpoint of a user, it is difficult to change a mind to select a single-mode portable terminal 6 from a plurality of the single-mode portable terminals 6. Therefore, in a case of a conventional structure where the specifications of the MMI for the variety of single-mode portable terminals 6 are simply added, a degree of unification of specifications is unsatisfactory for a user. Therefore, the specifications are incomprehensible, causing the ease of operation to considerably deteriorate. Hence it follows that development of the multimode portable terminal 7 must be performed such that following of the specification of the single-mode portable terminal 6 is not performed. The MMI portion must newly designed and developed such that all of the functions of the single-mode portable terminals 6 are included in the MMI portion. Therefore, a period of time required to develop the program for the MMI is elongated and the man-hours is increased undesirably. As the methods which must be combined increase, the foregoing problem becomes more critical.

As described above, the conventional multimode portable terminal 7 encounters excessive enlargement of the size of the case and the weight. Thus, the portability deteriorates. Moreover, integration of a plurality of communication methods into one terminal encounters a multiplicity of technical problems. The wireless telephone apparatus disclosed in Japanese Patent Laid-Open No. 7-50877 has the structure that the transmitter and the receiver are formed into the independent portion to improve the portability. The foregoing technique is, however, developed for the single-mode portable terminal 6. Therefore, any consideration is not made about switching of the method required for the multimode portable terminal 7.

SUMMARY OF THE INVENTION

In view of the foregoing, an object of the present invention is to provide a multimode mobile telephone apparatus which is capable of solving the above-mentioned problems, which is structured such that a plurality of portable terminals adapted to different methods are integrated into one terminal and which exhibits satisfactory portability and operability.

To solve the above-mentioned problems, according to the present invention, there is provided a multimode mobile telephone apparatus comprising: a transmitter; a receiver; a display unit; a dial input portion; and wireless communication unit for a plurality of communication methods to establish communication with a base station, in that the multimode mobile telephone apparatus is separated into single-mode portable terminals with which communication is established with the base station for each communication method, a transmitter, a receiver, a display unit and a dial input portion of each of the single-mode portable terminals are integrated into one shared MMI portable terminal, a local wireless communication unit is provided which establishes communication between the single-mode portable terminal and the MMI portable terminal by a wireless method, and selection and connection with an arbitrary single-mode portable terminal are performed from the MMI portable terminal through the local wireless communication means.

Preferably, in a multimode mobile telephone apparatus the MMI portable terminal incorporates means for displaying the selected and connected single-mode portable terminal on the display unit and operating the single-mode portable terminal.

Preferably, in a multimode mobile telephone apparatus, a program for operating each of the single-mode portable terminals is stored in each of the single-mode portable terminal, and means is provided for transferring the program from the single-mode portable terminal to the MMI portable terminal through the local wireless communication means and causing the MMI portable terminal to execute the program.

Preferably, in a multimode mobile telephone apparatus, the MMI portable terminal is provided with means for simultaneously selecting a plurality of terminals from each of the single-mode portable terminals through the local wireless communication means, joining voice signals of the terminals to one another through the MMI portable terminal and mutually transferring the voice signals to the terminals.

DETAILED DESCRIPTION OF THE PREFERRED EMBODIMENTS

Figure 1:
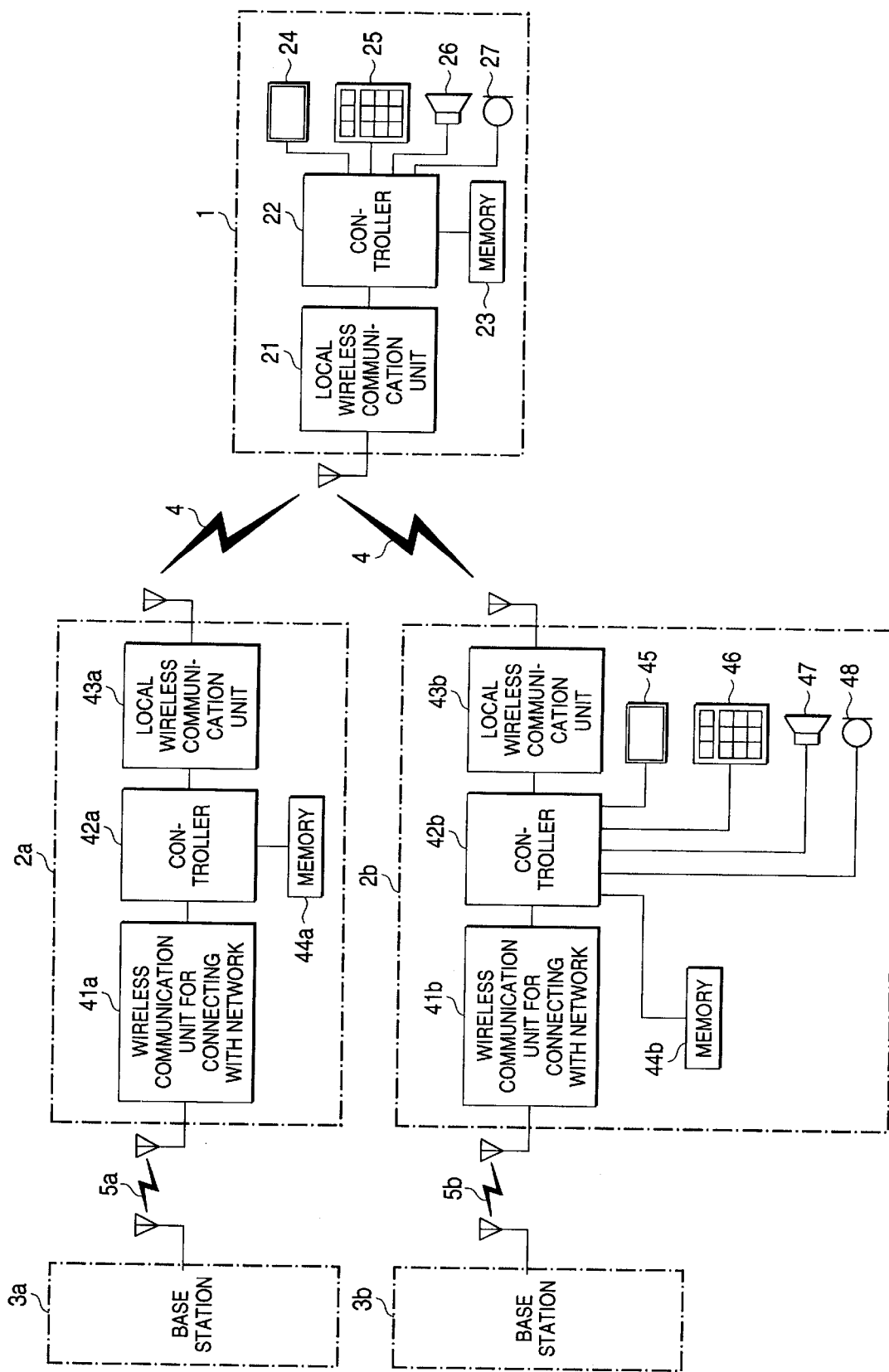
FIG. 1 is a diagram showing an example of the structure of a multimode mobile telephone apparatus according to the present invention.

An embodiment of the present invention will now be described with reference to the drawings. FIG. 1 is a diagram showing an example of the structure of a multimode mobile telephone apparatus according to the present invention. As shown in FIG. 1, the multimode mobile telephone apparatus according to the present invention incorporates one MMI portable terminal 1 and a plurality of single-mode portable terminals 2a and 2b (although the two single-mode portable terminals 2a and 2b are provided for the structure shown in FIG. 1, the number may be three or more).

The single-mode portable terminal 2a incorporates a wireless communication means 41a for establishing communication with a network for establishing communication with a base station 3a to connect a (telephone) network, a local wireless communication means 43a for establishing communication with MMI portable terminal 1 and a control circuit 42a including a CPU (not shown). Similarly, the single-mode portable terminal 2b incorporates a wireless communication means 41b for establishing communication with a network for performing communication with a base station 3b to connect a (telephone) network, a local wireless communication means 43b for establishing communication with MMI portable terminal 1 and a control circuit 42b including a CPU (not shown). In a case where three or more single-mode portable terminal are provided, a similar structure is employed.

In general, the wireless communication means 41a and 41b for establishing communication with a network are adapted to different methods. On the other hand, the local wireless communication means 43a and 43b are adapted to the same method. The single-mode portable terminal 2b shown in FIG. 1 incorporates the MMI portion, that is, the display unit 45, the key pad 46, the receiver 47 and the transmitter 48. The foregoing elements are employed to solely operate the single-mode portable terminal 2b in the portable manner. The foregoing elements are not employed when the multimode mobile telephone apparatus according to the present invention is operated.

Figure 2:
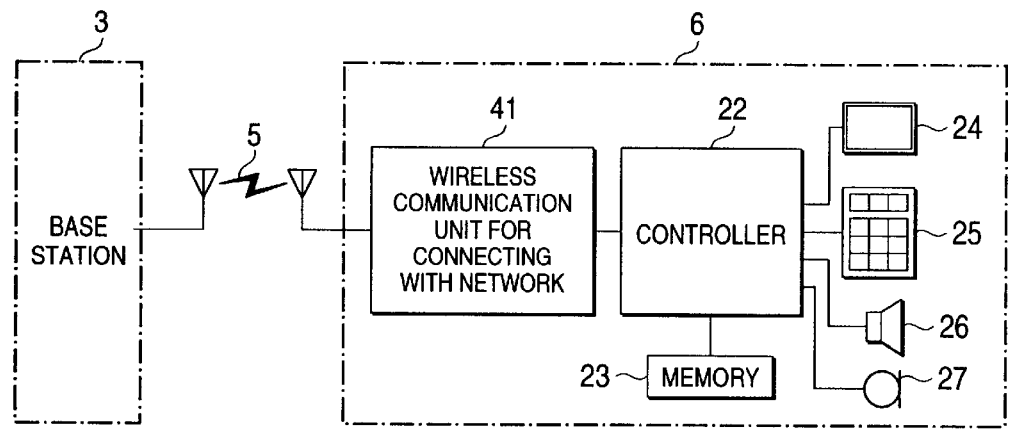
FIG. 2 is a diagram showing an example of the structure of a usual single-mode portable terminal.

The MMI portable terminal 1 incorporates a local wireless communication means 21 for establishing communication with the single-mode portable terminals 2a and 2b, a transmitter 27, a receiver 26, a key pad 25, a display unit 24, a control circuit 22 including a CPU (not shown) for controlling the foregoing elements and a memory 23 in which programs are stored. The size of the circuit and electric power consumption of the local wireless communication means 21 of the MMI portable terminal 1 are smaller to those of the wireless communication means 41 for establishing communication with a network of the conventional single-mode portable terminal 6 (see FIG. 2). Therefore, if the structures of the MMI portions are the same, the size and weight of the MMI portable terminal 1 can be reduced as compared with the conventional single-mode portable terminal 6. If the weights of the terminals are the same, a larger size display unit 24 and a larger number of keys can be mounted.

The control circuit 22 of the MMI portable terminal 1 and the control circuit 42a of the single-mode portable terminal 2a are able to communicate voice, data and commands through the local wireless communication means 21 and the local wireless communication circuit 4. Also similar communication is permitted between the control circuit 22 and the single-mode portable terminal 2b.

The MMI portable terminal 1 of the multimode mobile telephone apparatus according to the present invention is an interface portion with a user with which an operation using the key pad 25, output to the display unit 24 and input/output of voice are performed. On the other hand, the single-mode portable terminal 2a establishes communication with the base station 3a to perform all of processes of the mobile telephone. The MMI portable terminal 1 and the single-mode portable terminal 2a communicates commands, data and voice through the local wireless communication circuit 4 so as to integrally operate as a mobile telephone terminal. Also the MMI portable terminal 1 and the single-mode portable terminal 2b operate similarly Since a user performs all of the operations with the MMI portable terminal 1, the user is required to always transport the MMI portable terminal 1. Therefore, a necessity of transporting the single-mode portable terminals 2a and 2b can be eliminated. That is, the single-mode portable terminals 2a and 2b are required to be placed, for example, on the desk in an office or in a bag or in a car with which communication can be established with the MMI portable terminal 1 through the local wireless communication circuit 4. The MMI portable terminal 1, which is the multimode portable terminal, enables similar satisfactory operability to that permitted by the conventional single-mode portable terminal 6.

Figure 3:
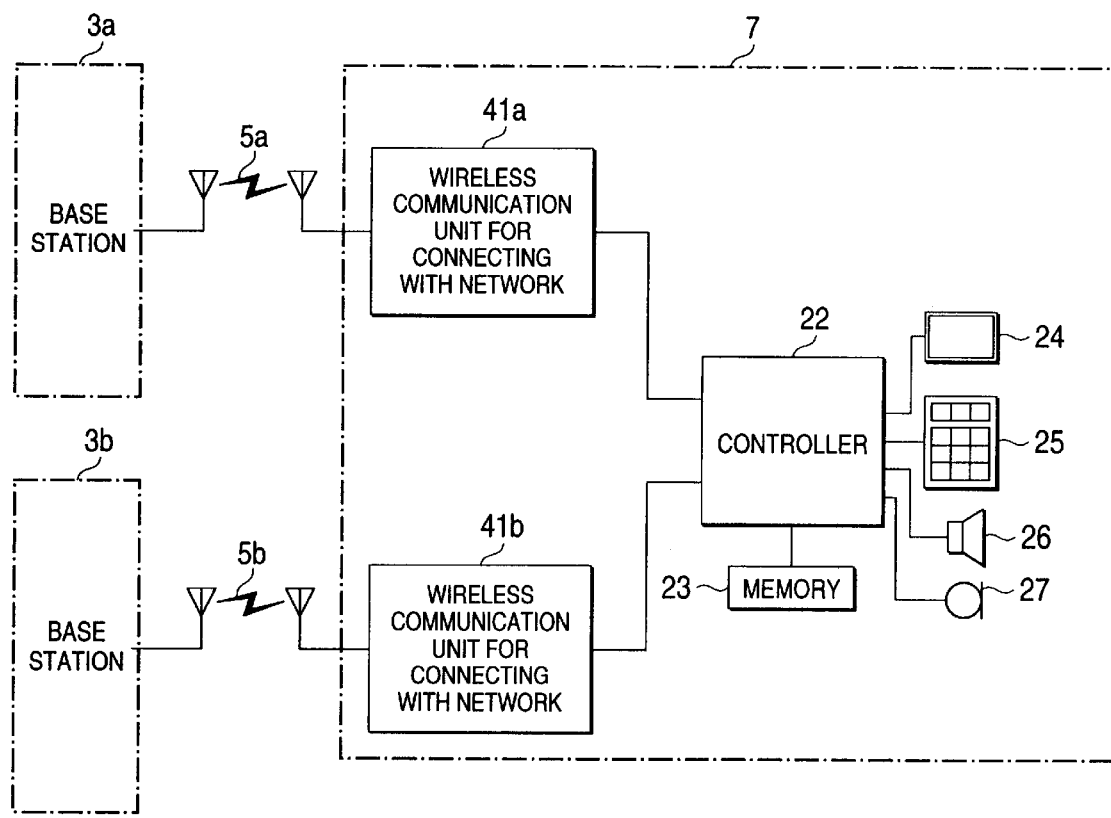
FIG. 3 is a diagram showing an example of the structure of a conventional multimode portable terminal.

Since the single-mode portable terminals 2a and 2b having independent structures are combined with each other to constitute the multimode mobile telephone apparatus, the wireless communication means 41a for establishing communication with a network and the wireless communication means 41b for establishing communication with a network having possibility of mutual interference are accommodated in different cases. Therefore, occurrence of mutual interference can be prevented as compared with the conventional integral-type multimode portable terminal 7 (see FIG. 3).

The MMI portable terminal 1 will now be described. The MMI processing programs adapted to different methods and corresponding to the single-mode portable terminals are stored in the memory 23. The corresponding single-mode portable terminal is displayed on the display unit 24 during use to perform the MMI process. Therefore, the user recognizes as if the two MMI, which are the single-mode portable terminal 2a and the single-mode portable terminal 2b are independently present on the MMI portable terminal 1. Since the user knows that the single-mode portable terminals 2a and 2b are adapted to different methods and the display unit 24 of the MMI portable terminal 1 displays the corresponding single-mode portable terminal, confusion can be prevented.

If either of or both of the single-mode portable terminals is not present in a range in which communication is permitted for the local wireless communication circuit 4 from a viewpoint of the MMI portable terminal 1 or if the operation is inhibited owing to exhaustion of the battery or the like, the MMI portable terminal 1 is arranged to communicate the user a fact that the single-mode portable terminal cannot be used by, for example, a method is employed with which the MMI of the corresponding single-mode portable terminal is erased from the screen. The foregoing communication is continued until the communication of the single-mode portable terminal is permitted by the MMI portable terminal 1 and the local wireless communication circuit 4.

Since the foregoing MMI portable terminal 1 is transported, the user is able to perform the operation as if the user has two single-mode portable terminals 2a and 2b. Therefore, making of the MMI program for the MMI portable terminal 1 of the multimode mobile telephone apparatus is intrinsically the same as making of the MMI program for the single-mode portable terminals 2a and 2b. Thus, if the MMI program for the single-mode portable terminals 2a and 2b exists, the foregoing MMI program can be used as it is. Therefore, the man-hours and cost can be reduced.

A variety of methods of operating the multimode mobile telephone apparatus according to the present invention will now be described. The MMI portable terminal 1 of the multimode mobile telephone apparatus according to the present invention is permitted to independently operate each of the single-mode portable terminals 2a and 2b. Moreover, voice of each of the plural single-mode portable terminals and voice of each of the receiver 26 and the transmitter 27 of the MMI portable terminal 1 are arbitrarily be connected or mixed with one another. Thus, conversations among a multiplicity of (three or more) persons and transference of the conversation are permitted. For example, when user A of the MMI portable terminal 1 is being in conversation with person B by using the single-mode portable terminal 2a, the conversation with B can be brought to the call-held state by interrupting communication of voice with the single-mode portable terminal 2a. In the foregoing state, conversation with person C using the single-mode portable terminal 2b can be performed. Another operation can be performed such that communication with C is held and the state of calling with B is restored.

The multimode mobile telephone apparatus according to the present invention is able to join and mix voice from the single-mode portable terminal 2a, that from the single-mode portable terminal 2b and that from the transmitter 27 to transmit the joined and mixed voice to the receiver 26. Therefore, conference communication can be realized.

When a call from a caller B is received by the single-mode portable terminal 2a, the call B is held by the above-mentioned method. A call is made to another person C by the single-mode portable terminal 2b to start conversation. Then, voice from the single-mode portable terminal 2a is transmitted to the single-mode portable terminal 2b. Then, voice from the single-mode portable terminal 2b is transmitted from the single-mode portable terminal 2a. Thus, transference of conversation from B to C can be performed. All of the foregoing functions are processed in accordance with the MMI program.

A method of loading the MMI program will now be described. Usually, the MMI program for each of the single-mode portable terminals is stored in the memory 23 in the MMI portable terminal 1. In this embodiment, the MMI program for each of the single-mode portable terminals 2a and 2b is stored in its memory. Thus, the MMI portable terminal 1 loads the MMI program to the memory 23 of the MMI portable terminal 1 through the local wireless communication circuit 4 so as to execute the MMI program as necessary.

The foregoing loading method enables a necessity for previously storing the MMI program in the memory 23 in the MMI portable terminal 1 to be eliminated. Therefore, the load required to develop the MMI portable terminal 1 can be reduced. Therefore, time required to manufacture the MMI portable terminal 1 can be shortened and cost required to develop the same can be reduced. If a new single-mode portable terminal is developed after the MMI portable terminal 1 has been developed, the MMI program can be used by loading the MMI program to the MMI portable terminal 1 through the local wireless communication circuit 4.

Timing at which the MMI program is loaded into the MMI portable terminal 1 is not limited to the moment immediately before the MMI program is executed. The loading operation may be performed at arbitrary timing. The MMI program may be loaded whenever execution is performed (as necessary). The MMI program which has been loaded may be stored in the memory 23 of the MMI portable terminal 1 so as to be used at second and following operations.

An apparatus which can be used as the single-mode portable terminal for constituting the multimode mobile telephone apparatus according to the present invention is not limited to the mobile telephone. A telephone terminal, such as a stationary telephone or an Internet telephone, a terminal, such as an interphone, which is similar to the telephone may be used if the terminal has the local wireless communication means 43.

As described above, according to the present invention having aspects claimed in claims, the following excellent effects can be obtained.

According to the present invention, the multimode mobile telephone apparatus is sectioned into the single-mode portable terminals with which communication is established with the base station for each communication method, the transmitter, the receiver, the display unit and the dial input portion of each of the single-mode portable terminals are integrated into one shared MMI portable terminal, the local wireless communication means is provided which establishes communication between the single-mode portable terminal and the MMI portable terminal by the wireless method, and selection and connection with an arbitrary single-mode portable terminal are performed from the MMI portable terminal through the local wireless communication means. Therefore, only the MMI portable terminal is required to be transported. The other single-mode portable terminals are permitted to be placed in a range in which the communication with the local wireless communication means is permitted. Therefore, the portability can be improved and development can easily be performed because the single-mode portable terminals are combined with one another. Moreover, mutual interference can be prevented.

Further, according to the present invention, the MMI portable terminal incorporates the means for displaying the selected and connected single-mode portable terminal on the display unit and operating the single-mode portable terminal. Therefore, portability and operability can be improved as compared with the conventional multimode portable terminal.

Further, according to the present invention, the program for operating each of the single-mode portable terminals is stored in each of the single-mode portable terminal, and the means is provided for transferring the program from the single-mode portable terminal to the MMI portable terminal through the local wireless communication means and causing the MMI portable terminal to execute the program. Therefore, time required to develop the MMI portable terminal can be shortened and the cost can be reduced. Moreover, adaptation to a communication method which is newly loaded can easily be performed.

Furthermore, according to the present invention, the MMI portable terminal is provided with means for simultaneously selecting a plurality of terminals from each of the single-mode portable terminals through the local wireless communication means, joining voice signals of the terminals to one another through the MMI portable terminal and mutually transferring the voice signals to the terminals. Therefore, a conference using conversations among a multiplicity of persons and control of transference of conversation can be performed.

What is claimed is:

1. A multimode mobile telephone system comprising:
   a man-machine interface portable terminal including a first controller, a first memory, and a first local wireless communication unit;
   a single-mode mobile terminal including a second controller, a second memory, a second local wireless communication unit, and a network connection unit connected with a base station,
   wherein said first and second local wireless communication units communicate using a wireless means,
   wherein a program for operating said single-mode portable terminal is stored in said second memory; and
   said first and second controllers transfer said program from said single-mode portable terminal to said man-machine interface portable terminal through said first and second local wireless communication units, and cause said man-machine interface portable terminal to execute said program.

2. The multimode mobile telephone system according to claim 1, wherein said man-machine interface portable terminal comprises: a display unit which displays a single-mode mobile terminal which is selected and connected, and a dial input unit which operates said single-mode mobile terminal.

3. The multimode mobile telephone system according to claim 1, wherein said man-machine interface portable terminal simultaneously selects a plurality of said single-mode mobile terminals through said local wireless communication means, joins voice signals of said terminals to one another through said man-machine interface portable terminal and mutually transfers said voice signals to said terminals.

* * * * *